United States Patent [19]
Dehne

[11] 3,802,570
[45] Apr. 9, 1974

[54] CYCLONE SEPARATOR

[76] Inventor: Manfred F. Dehne, 4141 S.W. Freeway, Houston, Tex. 77027

[22] Filed: Oct. 25, 1972

[21] Appl. No.: 300,859

[52] U.S. Cl. ............ 210/304, 55/391, 55/459, 209/211, 210/311, 210/512
[51] Int. Cl. ............ B04c 3/00, B01d 21/26
[58] Field of Search .......... 55/391, 459; 209/211; 210/84, 304, 311, 512

[56] References Cited
UNITED STATES PATENTS

| | | |
|---|---|---|
| 3,529,724 | 9/1970 | Maciula et al. ........... 210/512 X |
| 3,313,413 | 4/1967 | Delcellier ........... 209/211 |
| 3,675,401 | 7/1972 | Cordes ........... 55/459 X |
| 3,489,286 | 1/1970 | Estabrook ........... 210/512 |
| 3,417,871 | 12/1968 | Arnold ........... 209/211 X |

Primary Examiner—John Adee
Assistant Examiner—Robert H. Spitzer
Attorney, Agent, or Firm—Pravel, Wilson & Matthews

[57] ABSTRACT

A cyclone separator including improved means for stabilizing a fluid vortex created within the cyclone housing in order to improve separation efficiency and prevent reentrainment of particles into cleaned fluid.

14 Claims, 9 Drawing Figures

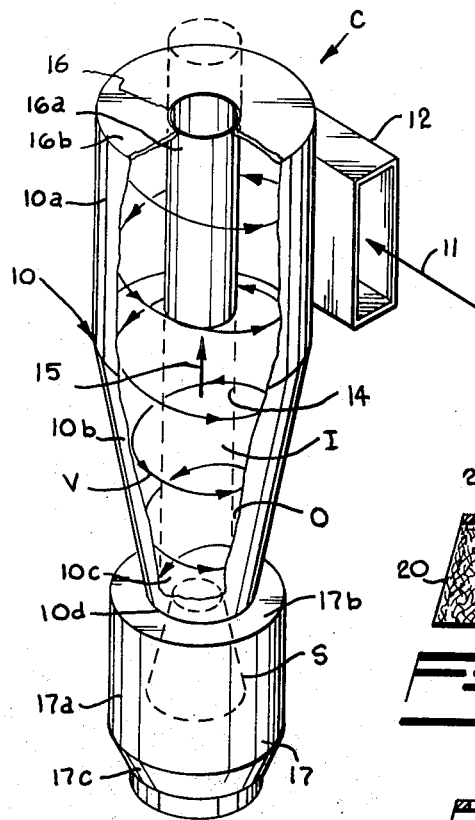

CYCLONE SEPARATOR

BACKGROUND OF THE INVENTION

The field of this invention is cyclone separators for separating particles from a fluid stream.

Cyclone separators are well known in the field of particle separation and collection from gas streams. Basically, a cyclone separator receives a gas stream and passes it through a cylindrical or conical housing thereby forming a vortex such that particles therein are separated from the gas stream and pass out a discharge outlet while the cleaned gas passes through a cleaned gas outlet. It is the centrifugal force created by the action of the vortex that causes particles to move toward the outside of the vortex thus leaving the cleaned gas at the vortex center, where the cleaned gas continually flows outwardly through the clean gas outlet. A serious problem with the efficiency of such cyclone separators is reentrainment of particles into the cleaned gas at the center of the swirling vortex. Such re-entrainment is most likely to occur in the region of the exit from the cylindrical or conical housing to the discharge outlet.

Various attempts have been made to prevent re-entrainment of particles into the cleaned air region of the vortex. For example, it has been suggested that a disc, hollow cone or cylinder be mounted at the vortex tube exit. It has also been suggested that a perfect cone having an apex pointing upward into the vortex tube be situated at the vortex tube exit.

SUMMARY OF THE INVENTION

It is an object of this invention to provide a new and improved cyclone separator for separating and collecting particles or particulate matter from a fluid stream (which may be gas or liquid) and for thereafter preventing re-entrainment of such particles or particulate matter into cleaned fluid. In the preferred embodiment of this invention, the cyclone separator includes an inlet duct means for receiving a fluid stream and a hollow housing mounted and cooperating with the inlet duct means to form the fluid stream into a fluid vortex. A particle discharge means or collector is mounted onto the exit of the hollow housing for receiving separated particles or particulate matter and collecting same. A clean fluid outlet is mounted within the upper portion of the hollow housing for receiving cleaned fluid which flows upwardly from the center region of the vortex. A hollow truncated cone or cylinder having a closed end is mounted in the exit region of the vortex tube for stabilizing and centering the vortex in order to minimize re-entrainment of particles settling out of the vortex.

BRIEF DESCRIPTION OF THE DRAWINGS

FIG. 1 is an isometric view of a cyclone separator of the preferred embodiment of this invention having mounted therein the stabilizing means of this invention;

FIG. 2 is a partly schematic and partly sectional view of the closed end, truncated cone vortex stabilizer of this invention;

FIG. 3 is a partly schematic and partly sectional view of the closed end, truncated cone having mounted thereon a centering pin; and FIG. 4 is a partly sectional and partly schematic view of a stabilizing means having an upper chamber for further stabilizing the vortex;

FIG. 5 is a view of the stabilizing arrangement of FIG. 4 with the upper chamber further providing for dispersement of particles from therein;

FIG. 6 is a schematic view of the placement of a wire mesh within the hollow, truncated cone portion in order to intercept particles from the air flowing upwardly through an opening in the closed end;

FIG. 7 is a schematic view similar to FIG. 6 wherein the particle intercepting means is expanded metal;

FIG. 8 is a view similar to FIG. 6 wherein the particle intercepting means is a series of baffles; and FIG. 9 is a view similar to FIG. 6 wherein the particle intercepting means is an alternating series of discs and donuts.

DESCRIPTION OF THE PREFERRED EMBODIMENT

Referring to the drawing, a cyclone separator or collector generally designated as C is provided for separating and collecting particles from a particle-laden gas stream. The cyclone C basically includes a hollow housing of a tubular or barrel configuration generally designated as 10 for receiving a flowing gas stream moving in the direction of arrow 11 through an inlet duct 12. The hollow housing 10 includes an upper cylindrical portion 10a which is mounted with the inlet duct 12 for receiving the gas stream which enters the upper cylindrical portion 10a tangentially. The hollow housing 10 further includes a lower, frustro-conical portion 10b which is mounted with the upper cylindrical portion 10a by any suitable means such as welding. The tangential entry of the gas stream into the hollow housing 10 converts the linear gas flow into a downwardly spiraling, rotating vortex generally designated as V. The vortex V rotates in a generally helical direction about axis 10f. However, it should be understood that the entire housing 10 may be cylindrical if desired, the principal requirement being that the housing 10 receive the particle-laden gas stream entering duct 12 and cooperate therewith to convert such gas stream into a vortex. The swirling action of the vortex V causes the particles in the gas stream within the vortex V to be moved to an outer region, which may be designated as O, of the vortex V. The movement of the particles or particulate in the vortex V into the outer region O thereof is caused by the centrifugal force exerted by the swirling action of the vortex V. The segregation of particles into outer vortex region O leaves substantially cleaned gas within the inner region generally designated by the letter I. The movement of cleaned gas inwardly to inner region I and the movement of particles outwardly into outer region O produces an interfering counterflow which tends to reduce somewhat the forces acting to separate the particles. Of course, it is understood that the vortex V is divided into the inner region I and the outer region O for the purposes of explanation. In actuality, it is not always possible to clearly define an actual or exact dividing line or plane, which we represent at 14, between the inner vortex region I and the outer vortex region O. However, for the purposes of explanation with respect to the dividing out of the particles from the vortex V, this nomenclature will be utilized.

The interaction of vortex flow results in a continuous upward flow in inner region I in the direction of arrow 15 toward a cleaned gas outlet 16 mounted within the upper cylindrical housing portion 10a. The cleaned gas outlet is a tube or pipe 16a mounted in the center of the upper cylindrical portion 10a by means of plate 16b which extends between the upper cylindrical portion 10a and the cleaned gas outlet tube 16a. Thus as the vortex V moves downwardly within the frustro-conical housing portion 10a and 10b, particles within the gas stream are moved outwardly into the outer vortex region O, thus leaving cleaned gas within the inner vortex region I, which cleaned gas moves upwardly through cleaned gas outlet tube 16a.

The particles in outer region O are moved toward inside housing wall 10e, and due to the downward axial component of vortex flow, the particles move downwardly into a discharge bin 17. The discharge outlet or bin 17 is mounted onto lower end 10d of the frustro-conical housing portion 10b for receiving the particles segregated from the vortex V. The discharge bin 17 includes a cylindrical portion 17a which is attached with the lower end 10d by an annular, horizontal plate 17b. The annular plate 17b may be mounted with the lower or bottom end 10d of the frustro-conical portion 10b by any suitable means such as welding. The discharge outlet 17 further includes a bottom discharge section 17c which can be connected to any suitable collection device (not shown) for receiving the particles from the discharge outlet 17.

One of the very difficult problems with the use of a cyclone C is that there is a tendency for the particles within the outer region O of the vortex V to re-entrain into the inner vortex region I near the exit 10c of the frustro-conical tube portion 10b. The re-entrainment of particles from the outer vortex region O to the inner vortex region I within the frustro-conical portion exit region 10c is thought to be caused by a movement of the axis of the tip of the vortex away from the center 10f. Movement of the vortex tip away from center 10f in the frustro-conical exit region 10c causes a disturbance of the rather delicate pressure/velocity relationship between the outer vortex region O and the inner vortex region I resulting in an increased flow of particles from outer region O to inner region I. Particles reentrained within the inner vortex region I are moved upwardly in the direction of arrow 15 and outwardly through the cleaned gas outlet tube 16a. This re-entrainment of particles from the outer region O of the vortex V reduces the efficiency of the cyclone C since the purity of the cleaned gas moving outwardly of the cleaned gas outlet tube 16 is reduced.

A stabilizer means generally designated as S is mounted in the exit area 10c of the frustro-conical vortex tube portion 10b and within the discharge outlet 17 for centering the tip of the vortex V within the exit area 10c in order to minimize re-entrainment of particles. The stabilizer means S includes a truncated, tubular section which in the preferred embodiment is hollow, truncated cone 20 having a closed upper end provided by a circular, flat plate 21. The conical wall portion 20 and the upper end plate 21 are both metal in the preferred embodiment of this invention and are mounted or attached by any suitable means such as welding. Referring to FIGS. 2 and 3, the upper plate 21 is flat and provides a flat upper surface 21a which cooperates with the cone portion 20 to maintain the tip of the vortex V substantially at the center 10f of the frustro-conical tube portion 10b in order to minimize re-entrainment of particles into the inner, cleaned gas vortex region I. The truncated cone portion 20 and upper end plate 21 are supported within the vortex exit area 10c and/or the discharge outlet 17 by any suitable means such as brackets 22a and 22b which extend between the end plate 21 and the discharge outlet 17. For purposes of description, it will be assumed that brackets similar to the brackets 22a and 22b are provided within each embodiment of the invention discussed herein; however, for the purposes of description, the actual brackets will be omitted in FIGS. 3 – 9.

The hollow, truncated cone portion 20 and upper end plate 21 cooperate to provide a low turbulence, inner chamber 23. An area of high turbulence designated by the arrow T exists between truncated wall portion 20 and inside wall 10e at the vortex tube exit area 10c and inside wall 17c of the discharge outlet 17. The providing of an area of low turbulence 23 enhances the separation of particles out of the particle-laden gas flowing downwardly through the annular space T by allowing particles within the particle-laden gas in the lower turbulence chamber 23 to settle outwardly more easily since the velocity of the particles within the low turbulence area 23 is substantially less than the velocity of particles within the high turbulence area T.

As previously discussed, centrifugal force acting on particles in vortex V moves such particles toward the frustro-conical wall 10e and; due to the downwardly acting component of particle velocity, the particles move outwardly into discharge bin 17. In addition to particles moving downwardly into the discharge bin 17, a certain amount of gas will be moved with the particles. It is thus desirable to return this gas from the discharge bin 17 to the cleaned gas inner vortex region I. A hole 24 is provided in the upper end plate 21 in order to allow fluid communication between the low turbulence chamber 23 and the vortex V swirling at or just above the upper flat surface 21a. During operation of the cyclone C, the swirling action of the vortex V along the upper end plate surface 21a causes a pressure differential to exist between the vortex V above the upper surface 21a and the low turbulence chamber 23 so that there is a tendency for gas to flow upwardly through the opening 24 and thus outwardly of the cleaned gas outlet tube 16a. In this manner, the efficiency of the cyclone C can be even greater since gases in the discharge outlet 17 are returnable after particles have settled outwardly thereof in the low turbulence chamber 23.

Referring to FIG. 3, a centering rod or pin 25 is mounted onto upper end plate surface 21a by any suitable means such as welding. The pin 25 is located at the center 10f of the frustro-conical vortex tube portion 10b in order to cooperate with the upper end plate 21 and hollow, truncated cone portion 20 to maintain the tip of vortex V swirling about the center 10f. It should be understood that the pin 10f may be solid or even hollow within, so long as such pin extends upwardly into the vortex tube exit area 10c substantially at the center 10f thereof. In an alternate embodiment of this invention, the truncated cone portion 20' has concave walls when viewed in elevation.

Referring to FIG. 4, a convex upper end plate 26 is mounted onto the truncated cone 20 in order to provide an upper convex surface 26a for cooperating with the truncated cone 20 to minimize re-entrainment of particles into the cleaned gas vortex region I. In another embodiment of this invention which is shown in imaginary lines in FIG. 4, an upper concave end plate 27 is mounted with the truncated cone 20 in order to provide an upper concave surface 27a to center the vortex V. Further, an upper chamber 28 is provided by mounting an upper cylindrical (which can be conical or other tubular shape) wall 29 onto the upper, convex end plate 26. The upper chamber 28 formed by the cylindrical wall 29 further prevents re-entrainment of particles into the cleaned gas vortex region I. It is thought at this time that the upper chamber 28 provided by the cylindrical wall 29 serves to reduce the pressure differential between the inner vortex region I and the outer vortex region O by suppressing the vacuum or low pressure within the inner vortex I. A reduction in pressure differential between the inner vortex region I and outer vortex region O serves to reduce the tendency of particles within the outer vortex region O to move inwardly into the inner vortex region I. The upper cylindrical wall 29 further serves to center the vortex V and thus prevent the vortex from moving toward inside vortex tube wall 10e.

The upper cylindrical wall 29 forming upper chamber 28 may be mounted onto truncated cone portion 20 with upper flat end plate 21 illustrated in FIGS. 1 and 2. Further, the upper, cylindrical wall 29 may be mounted onto truncated wall portion 20 having concave end plate 27 mounted therewith and providing the partition between the low turbulence chamber 23 and the upper chamber 28. A centering pin 25 can also be mounted onto the convex end plate 26 or onto the concave end plate 27 in order to cooperate with the truncated cone portion 20 to further center the inner region vortex I and prevent the tip of the vortex from moving toward the vortex housing wall 10e. Further, the centering pin 25 can be used in combination with the cylindrical wall 29 forming the upper chamber 28 to further minimize re-entrainment of particles.

The convex end plate 26 of FIG. 4 has an opening 24 therein in order to allow the return of gas from the low turbulence chamber into the inner vortex region I. Such an opening as 24 can also be provided in alternate embodiment concave upper end plate 27. The low turbulence chamber 23 can also be formed by a cylindrical walled portion 20'' or other tubular structure.

Referring to FIG. 5, the upper cylindrical wall 29 has a plurality of annular slots 31 positioned at lower end 29a thereof in order to allow the dispersement of particles from the vortex within upper chamber 29 outwardly into annular exit space T. Further, the pin 25 may be utilized in combination with the upper cylindrical wall 29 having annular slots 31 therein in order to further minimize re-entrainment.

As previously described, an opening such as 24 within upper end plate 21 allows the passage of gas from the low turbulence chamber 23 provided by truncated cone portion 20 upwardly into the vortex V swirling along upper surface 21a. Although particles do settle out of gas within the low turbulence chamber 23, it is desirable to further intercept particles within the lower chamber 23 in order to prevent such particles from passing upwardly into the vortex V about upper surface 21a. For any particles passing through the opening 24 back into the vortex V may be re-entrained within inner vortex region I and thus move outwardly through cleaned gas outlet 16 thereby reducing the efficiency of the cyclone C. In FIG. 6, a wire mesh 32 is positioned within the low turbulence chamber 23 in order to impede or intercept particles moving within the low turbulence chamber 23 such that such particles do not pass through opening 24. In FIG. 7, a baffle arrangement of expanded metal 33 is mounted within low turbulence chamber 23 such that cleaned gas passes through openings 33a in the expanded metal while particles are intercepted by the solid portions thereof. In FIG. 8, an arrangement of baffle plates 34 and 35 further slow down the velocity of particles within the chamber 23 and intercept such particles such that substantially cleaner gas passes through opening 24. Another baffle arrangement is illustrated in FIG. 9 for obstructing and intercepting particle movement through opening 24. The arrangement in FIG. 9 comprises a series of alternating donut plates 35 having an opening in the center thereof and center discs 36 aligned with the opening in the donut plates. It should be understood that many other baffle arrangements may be utilized to obstruct, impede and intercept particles within chamber 23 including various modifications of the baffle designs discussed herein such as positioning such baffle plates as 34 and 35 at various angles of inclination with respect to the horizontal.

The foregoing disclosure and description of the invention are illustrative and explanatory thereof, and various changes in the size, shape, and materials as well as in the details of the illustrated construction may be made without departing from the spirit of the invention. The fluid being cleaned has been described as a gas, it should be understood that such fluid can be particle or particulate-laden liquid, also.

In the embodiments disclosed herein, all of the various parts of the stabilizing means S as well as the inlet duct 12, vortex tube 10 and cleaned gas outlet 16 and discharge outlet 17 are metal such as a steel. However, any of these various sections of the cyclone C can be made of any other suitable material which can withstand any corrosive or other damaging effects of the particular gas stream. The cyclone C can be utilized in a number of industrial or other applications for separating particulate matter such as dust from a gas such as air. For example, such a cyclone can be utilized to recover cement dust, for catalyst recovery in petroleum refineries, for fly ash recovery, grain handling, granulated sugar handling, for cooling, drying, pelletizing as well as any other application where it is desired to clean a gas or liquid.

I claim:

1. A cyclone for separating particulate matter from a fluid stream comprising:
   an inlet means for receiving said fluid stream;
   a hollow housing mounted with said inlet means for cooperating therewith to form said fluid stream into a fluid vortex, said hollow housing including an inlet end at which said inlet means is mounted and an outlet end;
   a cleaned fluid outlet means mounted with said hollow housing for receiving cleaned fluid from said fluid vortex;
   a particle discharge means mounted with said hollow housing for receiving particulate matter from said fluid vortex; and
   a truncated tubular section mounted at said outlet end of said hollow housing and including stabilizer means for stabilizing and for substantially centering said fluid vortex in order to minimize re-entrainment of particulate matter into said cleaned fluid.

2. The structure set forth in claim 1, wherein said stabilizer means includes:
said truncated tubular section having a closed end.

3. The structure set forth in claim 1, wherein said stabilizer means includes:
said truncated tubular section is a hollow truncated cone having a closed end mounted with said housing.

4. The structure set forth in claim 2, including:
a pin mounted on said closed end of said tubular section and extending into said hollow housing.

5. The structure set forth in claim 2, wherein:
said closed end of said tubular section provides a flat surface.

6. The structure set forth in claim 2, wherein:
said closed end of said tubular section provides a concave surface.

7. The structure set forth in claim 2, wherein:
said closed end of said tubular section provides a convex surface.

8. The structure set forth in claim 2, wherein:
said closed end of said tubular section has an opening therein.

9. The structure set forth in claim 2, wherein:
said closed end of said tubular section having an opening therein;
particle intercept means positioned within said tubular section to intercept particles from fluid passing through said opening; and
said particle intercept means includes a plurality of baffles mounted in said tubular section.

10. The structure set forth in claim 2, including:
said first-mentioned tubular section and said closed end forming a first chamber; and
a second tubular section mounted at said closed end to form a second chamber for cooperating with said first-mentioned tubular section and said closed end to stabilize said fluid vortex.

11. The structure set forth in claim 10, including:
said closed end of said first-mentioned tubular section having an opening therein providing fluid communication between said first and second chambers.

12. The structure set forth in claim 10, including:
a pin mounted on said closed end and extending into said second chamber.

13. The structure set forth in claim 10, including:
said second tubular section has an opening therein to allow the passage of particles from said second chamber into said particle discharge means.

14. The structure set forth in claim 10, including:
said closed end of said first-mentioned tubular section having an opening therein; and
particle intercept means positioned within said first-mentioned tubular section to intercept particles from fluid passing through said opening.

* * * * *